G. TAYLOR.
Pulley.
No. 209,147.  Patented Oct. 22, 1878.
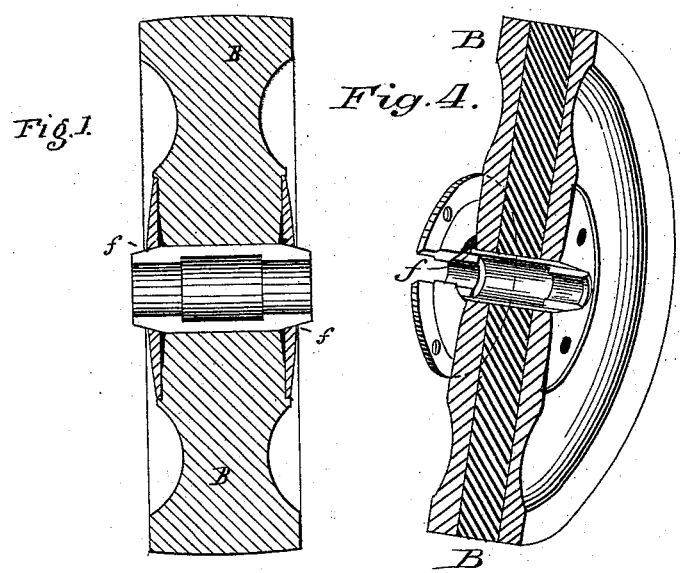
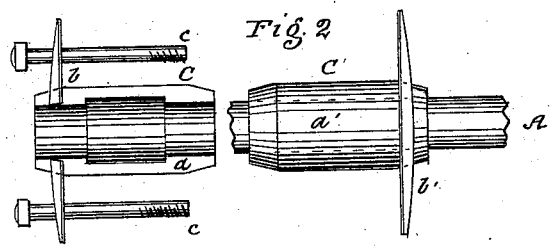
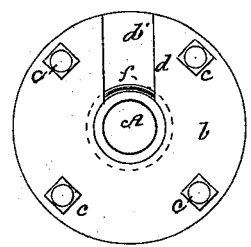
Witnesses:
Theodore Clark.
Jno. J. Gleason
Inventor:
George Taylor
By Wm. S. Thornton
his atty.

UNITED STATES PATENT OFFICE.

GEORGE TAYLOR, OF NEW YORK, N. Y.

IMPROVEMENT IN PULLEYS.

Specification forming part of Letters Patent No. 209,147, dated October 22, 1878; application filed September 2, 1878.

*To all whom it may concern:*

Be it known that I, GEORGE TAYLOR, of the city of New York, in the county and State of New York, have invented a certain new and useful Improvement in Pulleys; and I hereby declare the following to be a full, clear, and exact description thereof, reference being had to the accompanying drawings, making a part of this specification.

My invention relates to an improvement in the construction of the hub of a pulley for holding the web; and its object is to construct the same in a cheap and simple manner, and so that the pulley may be fixed upon a shaft between other pulleys without removing the latter, and so that the pulley may readily and easily be tightened up without affecting its balance in the least degree.

The invention consists in a hub composed of two separate sections, its sleeve being divided longitudinally through its center, and the end of each part thereof, on its outer surface, being made tapering to fit into a tapering aperture formed in each of the side flanges, so that when the said flanges are drawn toward each other, by means of horizontal screw-bolts passing through the same, the web is clamped thereby and the hub tightened upon the shaft simultaneously, and by one and the same movement.

A radial slot or opening is formed in each of the side flanges, to admit of its being placed upon the shaft.

In the accompanying drawings, Figure 1 represents a vertical transverse section of my improved hub with the pulley in position. Fig. 2 is an elevation of the two parts of the hub detached, and Fig. 3 is a side view of the hub. Fig. 4 is a perspective view of the pulley.

Similar letters of reference indicate the same parts in all the several figures.

A may represent the shaft upon which the pulley is placed, and B the web of a pulley, of suitable material, neither of which demands particular description, as they do not form part of my invention.

C C' represent the two sections of my improved hub, which are counterparts of each other, and are constructed as follows: $a$ $a'$ are the two portions of the sleeve that fits upon the shaft, and which is divided longitudinally through its center. $b$ $b'$ are the side flanges by and between which the web of the pulley is clamped, and $c$ $c$ $c$ $c$ are screw-bolts by which the hub is adjusted and tightened upon the web B and shaft A.

One portion of the said sleeve is cast solid with one of the side flanges, and the other portion of the same with the other side flange, and the outer surface of each of said portions, toward the end thereof, is made tapering, and passes through a tapering aperture, $f$, formed in the opposite side flange, so that when the plain faces of the sleeve are brought together, as shown in Fig. 2, and the said flanges are drawn toward each other, these tapering apertures, acting upon the tapering ends of the sleeve, cause the said sleeve to grasp the shaft the more tightly the nearer the flanges are brought together, and thus the web B is clamped by the said flanges and the hub tightened upon the shaft by one and the same movement. This movement is effected by the screw-bolts $c$ $c$ $c$ $c$, which pass through perforations in the said side flanges, $b$ $b'$. A radial slot or opening, $d$, is formed in each of the side flanges, $b$ $b'$, to admit of its being slipped onto the shaft.

By these means the pulley can be placed upon the shaft without taking down the latter or displacing any other pulleys that may already be in position thereupon; it can also be tightened upon the shaft without in any degree affecting its balance; and by means of my improvement a wooden pulley may be substituted in positions in which it is necessary to use a light pulley for the ordinary and heavy "split pulleys" heretofore used; and in addition to these advantages it is exceedingly simple and inexpensive in its construction.

I may state, in conclusion, that my improved hub may be applied to car-wheels and other kinds of wheels, as well as to pulleys, with like effect.

What I claim as my invention is—

A hub composed of two separate and corresponding sections, C C', its sleeve $a$ $a'$ being divided longitudinally through its center, and each portion made tapering toward its outer end, to fit into tapering apertures $f$ in the side flanges, $b$ $b'$, the said flanges being provided with radial slots $d$ $d'$, and the two sections being secured with screw-bolts $c$ $c$ $c$ $c$, all as herein shown and described.

GEORGE TAYLOR.

Witnesses:
THEO. H. FRIEND,
JOHN S. THORNTON.